(12) United States Patent
Lee

(10) Patent No.: US 9,992,641 B2
(45) Date of Patent: Jun. 5, 2018

(54) ELECTRONIC DEVICE, SERVER, AND METHOD FOR OUTPUTTING VOICE

(71) Applicant: Samsung Electronics Co., Ltd., Suwon-si (KR)

(72) Inventor: Woo-Jong Lee, Suwon-si (KR)

(73) Assignee: Samsung Electronics Co., Ltd. (KR)

( * ) Notice: Subject to any disclaimer, the term of this patent is extended or adjusted under 35 U.S.C. 154(b) by 0 days. days.

(21) Appl. No.: 14/728,715

(22) Filed: Jun. 2, 2015

(65) Prior Publication Data

US 2016/0156771 A1    Jun. 2, 2016

(30) Foreign Application Priority Data

Nov. 28, 2014 (KR) ........................ 10-2014-0168335

(51) Int. Cl.
| | |
|---|---|
| H04M 3/42 | (2006.01) |
| H04W 4/14 | (2009.01) |
| G06K 9/00 | (2006.01) |
| H04M 1/725 | (2006.01) |
| G09B 21/04 | (2006.01) |
| H04M 1/663 | (2006.01) |

(52) U.S. Cl.
CPC .......... *H04W 4/14* (2013.01); *G06K 9/00288* (2013.01); *G06K 9/00302* (2013.01); *G06K 9/00355* (2013.01); *H04M 1/72519* (2013.01); *H04M 1/72588* (2013.01); *G09B 21/04* (2013.01); *H04M 1/663* (2013.01); *H04M 2250/52* (2013.01); *H04M 2250/74* (2013.01)

(58) Field of Classification Search
CPC ........................ G02B 2027/0178; G10L 17/26
USPC ........ 455/550, 414.1, 41.2, 557, 569.2, 570, 455/412.1; 348/333.11, 156, 211.99, 348/207.1, 14.01, 220.1; 382/305, 128; 726/4; 705/4
See application file for complete search history.

(56) References Cited

U.S. PATENT DOCUMENTS

| | | | | |
|---|---|---|---|---|
| 8,311,973 | B1 * | 11/2012 | Zadeh ...................... | G06N 7/02 706/62 |
| 2002/0068600 | A1 * | 6/2002 | Chihara ................. | H04B 1/385 455/557 |
| 2004/0101212 | A1 * | 5/2004 | Fedorovskaya ... | G06F 17/30265 382/305 |
| 2011/0298829 | A1 * | 12/2011 | Stafford ............... | G06K 9/3208 345/659 |
| 2013/0208167 | A1 * | 8/2013 | Chou ................. | H04N 5/23219 348/333.11 |

(Continued)

FOREIGN PATENT DOCUMENTS

JP          2006163096 A       6/2006

*Primary Examiner* — Kiet Doan
(74) *Attorney, Agent, or Firm* — McAndrews, Held & Malloy, Ltd.

(57) ABSTRACT

According to an embodiment of the present disclosure, an electronic device may include a camera module obtaining image data of a user, a controller configured to detect at least one feature corresponding to an intention of the user from the image data obtained by the camera module, to obtain a pattern based on the at least one feature, to determine text data corresponding to the pattern, and to convert at least a portion of the text data into voice data, and an output module outputting the voice data. Other various embodiments of the pattern recognition are also provided.

12 Claims, 15 Drawing Sheets

(56) References Cited

U.S. PATENT DOCUMENTS

| | | | | |
|---|---|---|---|---|
| 2013/0324094 A1* | 12/2013 | Unetich | ............... | H04W 4/16 |
| | | | | 455/414.1 |
| 2014/0171037 A1* | 6/2014 | Park | ............... | H04W 4/16 |
| | | | | 455/414.1 |
| 2014/0337930 A1* | 11/2014 | Hoyos | ............... | H04L 63/10 |
| | | | | 726/4 |

* cited by examiner

| Applications | Neural network types |
|---|---|
| Pattern classifications | ADALINE<br>ART<br>Boltzmann Machine<br>Feature Map<br>Hamming Net<br>Multilayer Perceptron |
| Voice recognition | Multilayer Perceptron<br>Silicon Cochlea<br>Time-Delay Net<br>Viterbi Net |
| Image recognition | Cellular Automata<br>Connectionist Model<br>Neocognitron<br>Silicon Retina |
| Robot control | CMAC Cerebellum Model<br>Multilayer Perceptron<br>Topographic Map |
| Associative memory | Hopfield Model<br>Bidirectional Associative Memory |
| Signal processing | MADALINE<br>Multilayer Perceptron |
| Optimization and approximation | Boltzmann Machine<br>Cellular Automata<br>Counterpropagation Net<br>Hopfield Model<br>Winner-Take-All Net |

FIG.4A

ELECTRONIC DEVICE, SERVER, AND METHOD FOR OUTPUTTING VOICE

RELATED APPLICATION(S)

This application claims the benefit under 35 U.S.C. § 119(a) of a Korean patent application filed in the Korean Intellectual Property Office on Nov. 28, 2014 and assigned Serial No. 10-2014-0168335, the entire disclosure of which is incorporated herein by reference.

FEDERALLY SPONSORED RESEARCH OR DEVELOPMENT

[Not Applicable]

MICROFICHE/COPYRIGHT REFERENCE

[Not Applicable]

TECHNICAL FIELD

Embodiments of the present disclosure are directed to electronic devices, servers, and methods for outputting a voice.

BACKGROUND OF THE INVENTION

A mobile phone user unavailable to answer someone's call may have a few call refusal options, such as simply ignoring, declining the incoming call by touch-and-dragging the Decline button, and sending out a text message like "Can't talk right now" to let the caller know his unavailability. For the third option, the user may choose a sample message predefined by the manufacturer or a custom message that the user has typed before. Meanwhile, text messaging may be used as an alternative communication means by those who have temporarily or permanently lost their voice.

As such, mobile messaging may offer a friendly way to reject calls for phone users who desire to decline incoming calls without hurting the caller's feelings and enables communication between one with speaking disability and others.

However, such communication method requires text typing, which is sometimes annoying and takes time.

The above information is presented as background information only to assist with an understanding of the present disclosure. No determination has been made, and no assertion is made, as to whether any of the above might be applicable as prior art with regard to the present disclosure.

BRIEF SUMMARY OF THE INVENTION

According to various embodiments of the present disclosure, an electronic device, server, and method for outputting a voice enables the user's intention to be output as a voice, allowing for communication with the other party on the line of a call.

According to an embodiment of the present disclosure, an electronic device may include a camera module obtaining image data of a user; a controller configured to detect at least one feature corresponding to an intention of the user from the image data obtained by the camera module, to obtain a pattern based on the at least one feature, to determine text data corresponding to the pattern, and to convert at least a portion of the text data into voice data; and an output module outputting the voice data.

According to an embodiment of the present disclosure, an electronic device may include a camera module obtaining image data of a user; a controller configured to transmit image data obtained by the camera module to a server, to receive text data or voice data corresponding to the image data from the server, and to output voice data corresponding to the image data; and an output module outputting the voice data, wherein at least one feature corresponding to an intention of the user is detected from the image data obtained by the camera module, and a pattern is obtained based on the at least one feature, wherein the text data is determined corresponding to the pattern, and wherein at least a portion of the text data is converted into the voice data.

According to an embodiment of the present disclosure, a server may include a communication module receiving image data from an electronic device; and a controller configured to detect at least one feature corresponding to an intention of a user from the received image data, to obtain a pattern based on the at least one feature, to determine text data corresponding to the pattern or to convert at least a portion of the text data into voice data, and to transmit the text data or the voice data to the electronic device through the communication module.

According to an embodiment of the present disclosure, a method for outputting voice data by an electronic device may comprise obtaining image data of a user using a camera module; detecting at least one feature corresponding to an intention of the user from the image data obtained by the camera module; obtaining a pattern based on the at least one feature and determining text data corresponding to the pattern; converting at least a portion of the text data into voice data; and outputting the voice data.

According to an embodiment of the present disclosure, a method for outputting voice data by an electronic device may include obtaining image data of a user using a camera module; transmitting the image data obtained by the camera module to a server; receiving text data or voice data corresponding to the image data from the server; and outputting the voice data.

Other aspects, advantages, and salient features of the disclosure will become apparent to those skilled in the art from the following detailed description, which, taken in conjunction with the annexed drawings, discloses exemplary embodiments of the disclosure.

BRIEF DESCRIPTION OF SEVERAL VIEWS OF THE DRAWINGS

A more complete appreciation of the present disclosure and many of the attendant aspects thereof will be readily obtained as the same becomes better understood by reference to the following detailed description when considered in connection with the accompanying drawings, wherein:

FIGS. 4A to 4C are views illustrating a neural network approach according to an embodiment of the present disclosure;

Throughout the drawings, like reference numerals will be understood to refer to like parts, components, and structures.

DETAILED DESCRIPTION OF THE INVENTION

Figure 1:
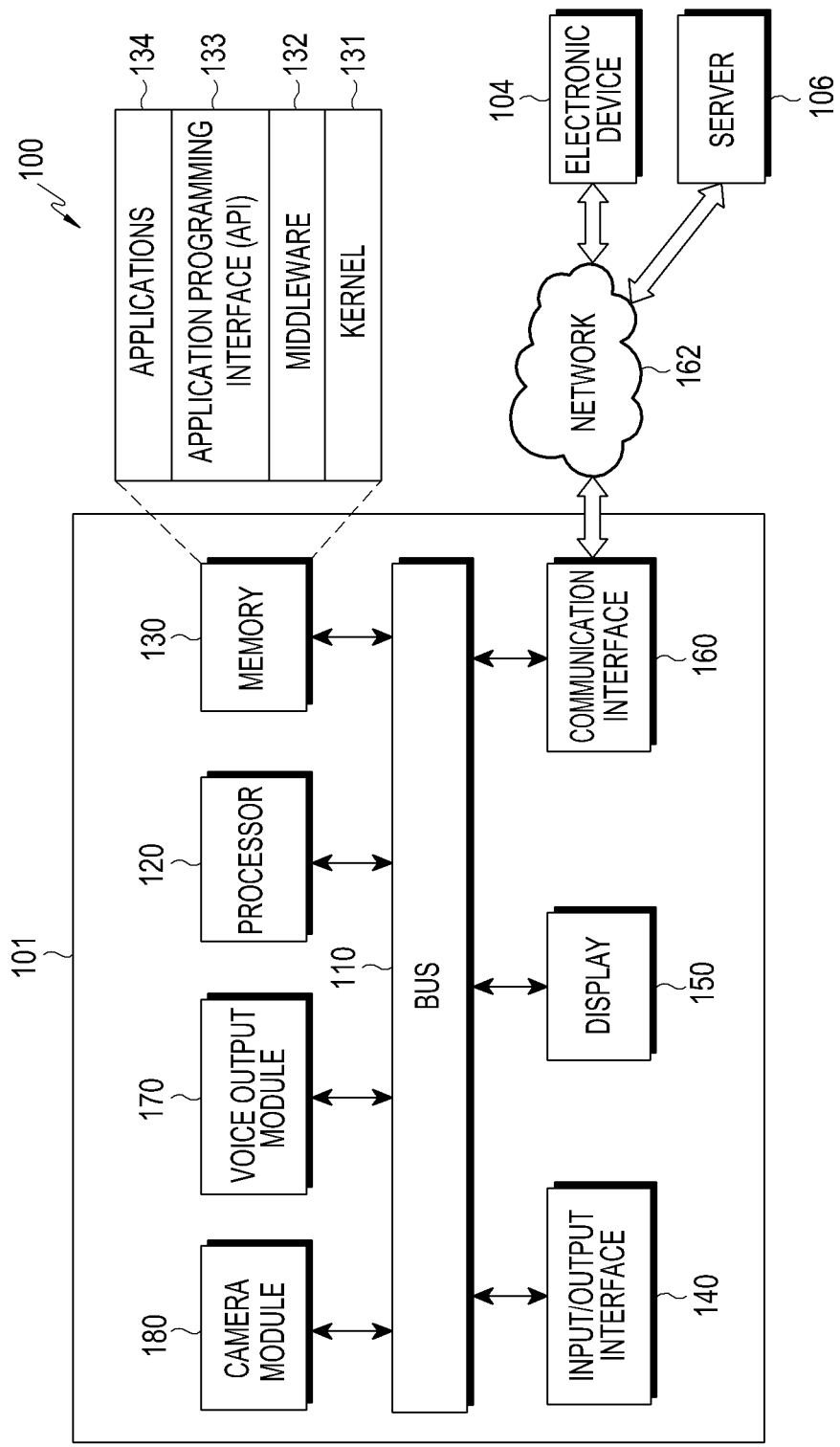
FIG. 1 is a view illustrating a network configuration including an electronic device according to an embodiment of the present disclosure.

Hereinafter, embodiments of the present disclosure are described with reference to the accompanying drawings. Various changes may be made to the present disclosure, and the present disclosure may come with a diversity of embodiments. Some embodiments of the present disclosure are shown and described in connection with the drawings. However, it should be appreciated that the present disclosure is not limited to the embodiments, and all changes and/or equivalents or replacements thereto also belong to the scope of the present disclosure. The same or similar reference denotations are used to refer to the same or similar elements throughout the specification and the drawings.

The terms "comprise" and/or "comprising" as herein used specify the presence of disclosed functions, operations, or components, but do not preclude the presence or addition of one or more other functions, operations, or components. It will be further understood that the terms "comprise" and/or "have," when used in this specification, specify the presence of stated features, integers, steps, operations, elements, and/or components, but do not preclude the presence or addition of one or more other features, integers, steps, operations, elements, components, and/or groups thereof.

As used herein, the term "and/or" includes any and all combinations of one or more of the associated listed items. For example, "A or B" may include A, or include B, or include both A and B.

Ordinal numbers as herein used, such as "first", "second", etc., may modify various components of various embodiments, but do not limit those components. For example, these terms do not limit the order and/or importance of the components. These terms are only used to distinguish one component from another. For example, a first user device and a second user device are different user devices from each other. For example, a first component may be denoted a second component, and vice versa without departing from the scope of the present disclosure.

When a component is "connected to" or "coupled to" another component, the component may be directly connected or coupled to the other component, or other component(s) may intervene therebetween. In contrast, when a component is "directly connected to" or "directly coupled to" another component, no other intervening components may intervene therebetween.

The terms as used herein are provided merely to describe some embodiments thereof, but not to limit the present disclosure. It is to be understood that the singular forms "a," "an," and "the" include plural references unless the context clearly dictates otherwise.

Unless otherwise defined, all terms including technical and scientific terms used herein have the same meaning as understood by one of ordinary skill in the art to which the embodiments of the present disclosure belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

According to an embodiment of the present disclosure, an electronic device as disclosed herein may be a device with a biometric function. Examples of the electronic device may include, but is not limited to, a smartphone, a tablet PC, a mobile phone, a video phone, an e-book reader, a desktop personal computer (PC), a laptop computer, a netbook computer, a personal digital assistant (PDA), a portable multimedia player (PMP), an MP3 player, a mobile medical device, a camera, or a wearable device (e.g., a head-mounted device (HMD), electronic clothes, an electronic bracelet, an electronic necklace, an electronic appcessory, an electronic tattoo, or a smart watch).

According to an embodiment of the present disclosure, the electronic device may be a smart home appliance with a biometric function. For example, examples of the smart home appliance may include, but is not limited to, a television, a digital video disk (DVD) player, an audio player, a refrigerator, an air conditioner, a vacuum cleaner, an oven, a microwave oven, a washer, a drier, an air cleaner, a set-top box, a TV box (e.g., Samsung HomeSync™, Apple TV™, or Google TV™), a gaming console, an electronic dictionary, a camcorder, or an electronic picture frame.

According to an embodiment of the present disclosure, examples of the electronic device may include, but is not limited to, various medical devices (e.g., a magnetic resource angiography (MRA) device, a magnetic resource imaging (MRI) device, a computed tomography (CT) device, an imaging device, or an ultrasonic device), a navigation device, a global positioning system (GPS) receiver, an event data recorder (EDR), a flight data recorder (FDR), an automotive infotainment device, a sailing electronic device (e.g., a sailing navigation device, a gyroscope, or a compass), avionic devices, security devices, vehicular head units, industrial or home robots, automatic teller's machines (ATMs), or point of sales (POS) devices.

According to various embodiments of the present disclosure, examples of the electronic device may include, but is not limited to, part of furniture or building/structure, an electronic board, an electronic signature receiving device, a projector, or various measurement devices (e.g., devices for measuring water, electricity, gas, or electromagnetic waves), each of which includes a biometric function. According to an embodiment of the present disclosure, the electronic device may be one or a combination of the above-listed devices or appliances. According to an embodiment of the present disclosure, the electronic device may be a flexible device. According to an embodiment of the present disclosure, the electronic device is not limited to the above-listed devices or appliances.

Various embodiments of the present disclosure are now described with reference to the accompanying drawings. As used herein, the term "user" may denote a human or another device using the electronic device.

FIG. 1 illustrates a network configuration 100 including an electronic device 101 according to an embodiment of the present disclosure. Referring to FIG. 1, the electronic device 101 may include a bus 110, a processor 120, a memory 130, an input/output interface 140, a display 150, a communication interface 160, an information or voice output module 170, and a camera module 180.

The bus 110 connects the other components to each other, and the bus 110 may be a component communicating (e.g., control messages or data) between the other components.

The processor 120 may receive a control message or data from other component (e.g., the memory 130, the input/output interface 140, the display 150, the communication interface 160, or the voice output module 170) through, for example, the bus 110, may interpret the received control message or data, and may execute control, computation or data processing according to the interpreted result.

The memory 130 may store a control message or data received from another component (e.g., the input/output interface 140, the display 150, the communication interface 160, or the voice output module 170) or a control message or data generated by the processor 120 or other component. The memory 130 may retain programming modules including, for example, a kernel 131, middleware 132, an application programming interface (API) 133, or an application 134. The programming modules may be configured in software, firmware, hardware or a combination of two or more thereof.

The kernel 131 may control or manage system resources (e.g., the bus 110, the processor 120, or the memory 130) used to execute the operation or function implemented in the other programming modules, for example, the middleware 132, the API 133 or the application 134. The kernel 131 may provide an interface that allows the middleware 132, the API 133, or the application 134 to access the individual components of the electronic device 101 to control or manage the same.

The middleware 132 may function as a relay to allow the API 133 or the application 134 to communicate data with the kernel 131. A plurality of applications 134 may be provided. The middleware 132 may control (e.g., scheduling or load balancing) work requests received from the applications 134, for example, by allocation the priority of using the system resources of the electronic device 101 (e.g., the bus 110, the processor 120, or the memory 130) to at least one of the plurality of applications 134.

The API 133 is an interface allowing the application 134 to control functions provided from the kernel 131 or the middleware 132. For example, the API 133 may include at least one interface or function (e.g., a command) for file control, window control, image processing or text control.

According to an embodiment of the present disclosure, there may be provided a plurality of applications 134 including an SMS/MMS application, an email application, a calendar application, an alarm application, a healthcare application (e.g., an application for measuring exercise amount or blood sugar), or an environmental information application (e.g., an application providing atmospheric pressure, moisture, or temperature information). Additionally or alternatively, the application 134 may be an application related to information exchange between the electronic device 101 and an external electronic device (e.g., electronic device 104). Examples of the information exchange-related application may include, but is not limited to, a notification relay application for transferring specific information to the external electronic device, or a device management application for managing the external electronic device.

For example, the notification relay application may include a function for relaying notification information generated from other applications of the electronic device 101 (e.g., Short Message Service (SMS)/Multimedia Messaging Service (MMS) application, email application, healthcare application, or environmental information application) to the external electronic device (e.g., the electronic device 104). Additionally or optionally, the notification relay application may receive notification information from the external electronic device (e.g., the electronic device 104) and may provide the received notification information to the user. The device management application may perform at least some functions of the external electronic device (e.g., the electronic device 104) communicating with the electronic device 101 (e.g., turning on/off the external electronic device (or some components of the external electronic device) or control of brightness (or resolution) of the display), and the device management application may manage (e.g., install, delete, or update) an application operating in the external electronic device or a service (e.g., call service or message service) provided from the external electronic device.

According to an embodiment of the present disclosure, the application 134 may include an application designated depending on the attribute (e.g., type of electronic device) of external electronic device (e.g., the electronic device 104). For example, in case the electronic device is an MP3 player, the application 134 may include an application related to playing music. Similarly, in case the external electronic device is a mobile medical device, the application 134 may include an application related to healthcare. According to an embodiment of the present disclosure, the application 134 may include an application designated to the electronic device 101 or an application received from an external electronic device (e.g., a server 106 or the electronic device 104).

The input/output interface 140 may deliver control messages or data input from the user or an external electronic device through an input device (e.g., a touchscreen, a microphone, a keyboard, or a communication module) to the processor 120, the memory 130, the communication interface 160, or the voice output module 170 via, for example, the bus 110. For example, the input/output interface 140 may provide data regarding the user's touch input through a touchscreen to the processor 120. The input/output interface 140 may output, through the output device (e.g., a speaker, display, or communication module), control messages or data received from the processor 120, the memory 130, the communication interface 160, or the voice output module 170 through, for example, the bus 110. For example, the input/output interface 140 may output voice data processed by the processor 120 to the user through a speaker.

The display 150 may display various types of information (e.g., multimedia data or text data) to the user. The display 150 may be combined with a touch panel, forming a touchscreen.

The communication interface 160 may interface communication between the electronic device 101 and an external electronic device (e.g., the electronic device 104 or the server 106). For example, the communication interface 160 may be wiredly or wirelessly connected with the network 162 to communicate with the external electronic device. The wireless connection may be made by various radio communication protocols, including, but not limited to, wireless fidelity (WiFi), Bluetooth (BT), near field communication (NFC), global positioning system (GPS), or cellular communication protocols (e.g., Long Term Evolution (LTE), LTE-Advanced (LTE-A), Code Division Multiple Access (CDMA), Wideband CDMA (WCDMA), Universal Mobile Telecommunication Systems (UMTS), Wireless Broadband (WiBro) or Global System for Mobile communications (GSM)). The wired connection may be made by various wired communication protocols, including, but not limited to, universal serial bus (USB), high definition multimedia interface (HDMI), recommended standard 232 (RS-232), or plain old telephone service (POTS).

According to an embodiment of the present disclosure, the network 162 may be a telecommunication network. The telecommunication network may include a computer network, the Internet, an Internet of things (IoT) network, or a telephone network. According to an embodiment of the present disclosure, protocols for communication between the electronic device 101 and the external electronic device (examples of such protocols include, but not limited to, transport layer protocol, data link layer protocol, or physical layer protocol) may be supported by the application 134, the API 133, the middleware 132, the kernel 131, or the communication interface 160.

The voice output module 170 may be functionally connected with other components (e.g., the processor 120, the memory 130, the input/output interface 140, or the communication interface 160) to obtain information on the state of the electronic device 101 (e.g., whether the user carries the electronic device or not, at least). The voice output module 170 may independently control a plurality of input/output devices (e.g., a sensor, a touch panel, a microphone, a speaker, a display, or a communication module) through, for example, the input/output interface 140 based on the state of the electronic device 101. At least one configuration or function of the voice output module 170 may be performed similarly to the processor 120. The voice output module 170 and the processor 120, alone or together, may be referred to as a controller. Details of the voice output module 170 are provided below in connection with FIGS. 2 to 7.

The camera module 180 is a device that may capture a still image and a video. The camera module 180 obtains an image or image data for delivering the user's intention by filming the user. The obtained image data may include image data for the user's face, and the obtained image data may further include image data for the user's gesture, such as a hand motion.

Figure 2:
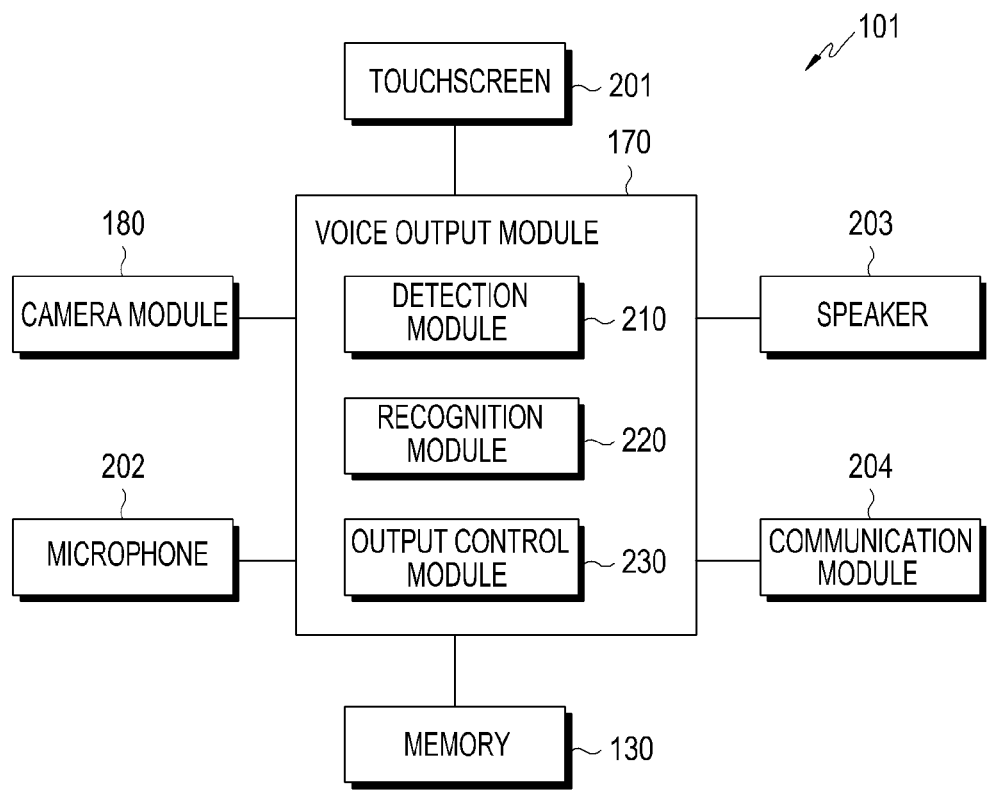
FIG. 2 is a block diagram illustrating a voice output module according to an embodiment of the present disclosure.

FIG. 2 illustrates a voice output module 170 of an electronic device (e.g., the electronic device 101) according to an embodiment of the present disclosure. Referring to FIG. 2, the electronic device 101 includes a voice output module 170, a camera module 180, and a communication module 204. The electronic device 101 may further include a microphone 202 and a speaker 203.

The voice output module 170 may include a detection module 210, a recognition module 220, and an output control module 230.

According to an embodiment of the present disclosure, the detection module 210 may receive image data for delivery of the user's intention from the camera module 180. The image data for delivery of the user's intention may include image data for the user's face. The image data for delivery of the user's intention may further include image data for the user's gesture, such as a hand motion.

The detection module 210 may process the image data received from the camera module 180 in real-time, in each time interval, or in each unit of input capacity, considering the processing speed of the processor and the memory.

According to an embodiment of the present disclosure, when receiving the image data for delivery of the user's intention from the camera module 180, the detection module 210 may store the image data in the memory 130. The output control module 230 may pre-process (e.g., noise removal, signal amplification, or gray level normalization) the image data using an image processing algorithm, and the output control module 230 may detect at least one feature from the pre-processed image data. According to an embodiment of the present disclosure, the feature may include a specific portion of the user's body, whose shape is changed when the user speaks. The feature may include, for example, the shape of the user's mouth or a portion around the mouth, the shape of the user's eye, the user's look or a change in the user's look (e.g., movement of the user's facial muscles), the user's eye blink, or a change in position of the user's eyebrow. The feature may further include the user's hand motion or gesture as well as the variations in the user's face. The detection module 210 may detect at least one feature from the image data and may deliver the detected feature to the recognition module 220. The detection module 210 may detect the feature as follows. For example, when the user speaks at low tone or changes the shape of his mouth without speaking out as if he actually talks to another person before him to deliver his intention to the other person, the user's facial shape may be changed due to, for example, varied eye size, eyebrow position, or facial muscle shape. The user may also make a hand motion. As such, the detection module 210 may detect the feature from the image by detecting the user's facial feature or hand motion. The user's individual characteristics may be noticeably and distinguishably identified in various illumination environments from the changes in the user's facial expression and changes in the position of the user's face and hand detected from the image obtained by the camera module 180. For example, the user's face may be detected from an image obtained by the camera module 180 using bitmap computation, and in such case, the image data corresponding to the obtained image may be converted into gray image data that may be then binarized into black-and-white data with pixel values of, for example, TRUE's and FALSE's or 1's and 0's, with respect to a predetermined threshold. The pixels of the binarized image data may be labeled to define a group of facial feature points which respectively correspond to, for example, a pupil, an eyebrow, a lip, the tough, the nose, an ear, and a cheekbone of the user. A convolution filter may be used to detect an outline from the binarized image. The detection of the outline may accelerate the labeling. Such process of defining the facial feature points may be influenced by various factors, such as illumination environments and poses. Accordingly, the threshold may be varied to obtain a proper result.

According to an embodiment of the present disclosure, the recognition module 220 may combine at least one feature received from the detection module 210, and the recognition module 220 may obtain a pattern corresponding to the combined feature using a pattern recognizer that has been sufficiently pre-trained. The recognition module 220 may obtain a pattern corresponding to at least one combined feature using a pattern recognizer included in the electronic device 101 (this pattern recognizer may be referred to as a first pattern recognizer) and a pattern recognizer that has been additionally trained in the user's own features and that is included in the server 106. The recognition rate of the pattern may be further increased by obtaining the pattern using the first pattern recognizer and the second pattern recognizer. The recognition module 220 may apply the obtained pattern to a pattern recognition algorithm, and based on a resultant value, the recognition module 220 may determine the user's intention represented by the pattern. Text data may be determined based on the determined intention of the user. The output control module 230 may perform control to output the text data as a phoneme, a syllable, a phrase, a clause, and a sentence. Generally, the term "feature" may refer to a distinctable aspect, quality or nature of some input data or information, and the term "pattern" may refer to a group of individual characteristics or natures. The pattern may be organized into a feature vector, a feature space, and a distribution plot. When a feature has one or more values, the feature vector may be represented as a d-dimensional column vector. The feature space refers to the d-dimensional space where the feature vector is defined. The distribution plot refers to a figure obtained by representing recognition objects with the points formed by the feature vector in the feature space. The recognition rate of the features detected from the image data for delivery of the user's intention may be increased when the features may be distinct from each other. A high recognition rate may be achieved for inputs from the same class when the inputs have the same or similar feature and for inputs from different classes when the inputs have distinct features. Classification for pattern recognition refers to allocate target objects to specific classes, respectively. A majority of pattern recognition techniques are directed to addressing the classification issue. Pattern recognition systems dealing with the classification issue require a clear determination, such as, with an integer label, rather than an ambiguous fuzzy result. For example, a classification requires a clear determination as to whether the user says "ah" or "euh" from the shape of the user's mouth obtained from the image data. Regression in the pattern recognition field refers to generalizing a classification. The term "generalization" may mean when a valid result may be acquired from text data by a model obtained from learned data. A result estimated with an error label may be obtained through the regression from an output of a pattern recognition system. In other words, the regression enables prediction. The term "clustering" in the pattern recognition field refers to organizing a set of objects into a plurality of meaningful groups. An output from a clustering system is the class where the objects belong. Clustering may be hierarchically processed as if life forms are classified into species. Pattern recognition represents target objects in a series of prototypes or primitive forms. A pattern recognition system may conduct a structural or linguistic description on an object.

Figure 3A:
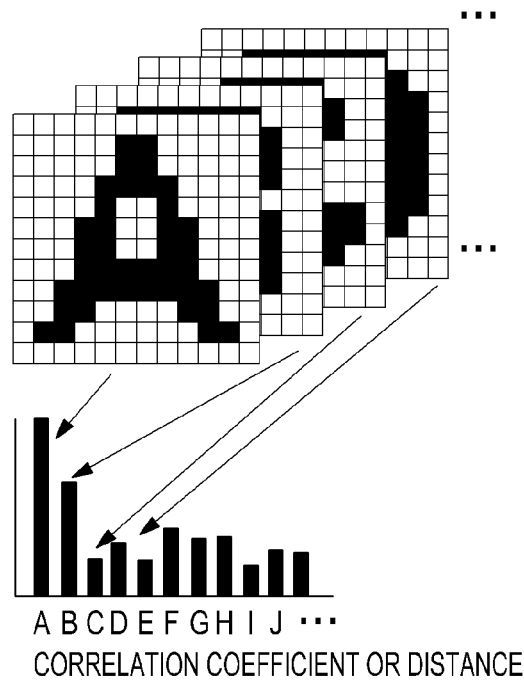
FIGS. 3A to 3D are views illustrating various types of pattern recognition algorithms according to embodiments of the present disclosure.
Figure 3B:
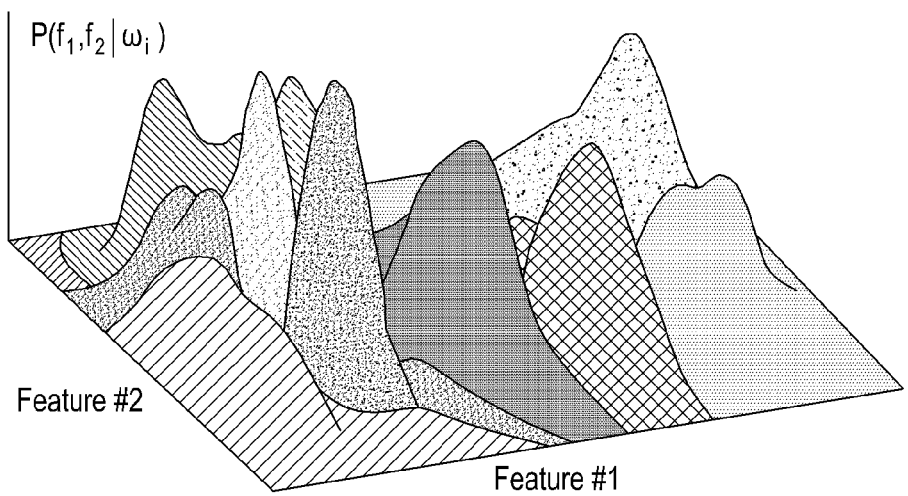
Figure 3C:
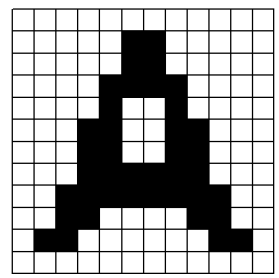
Figure 3C:
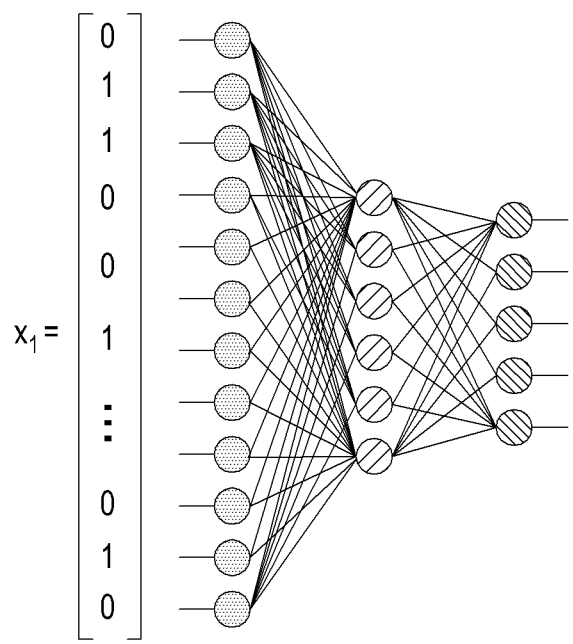
Figure 3D:
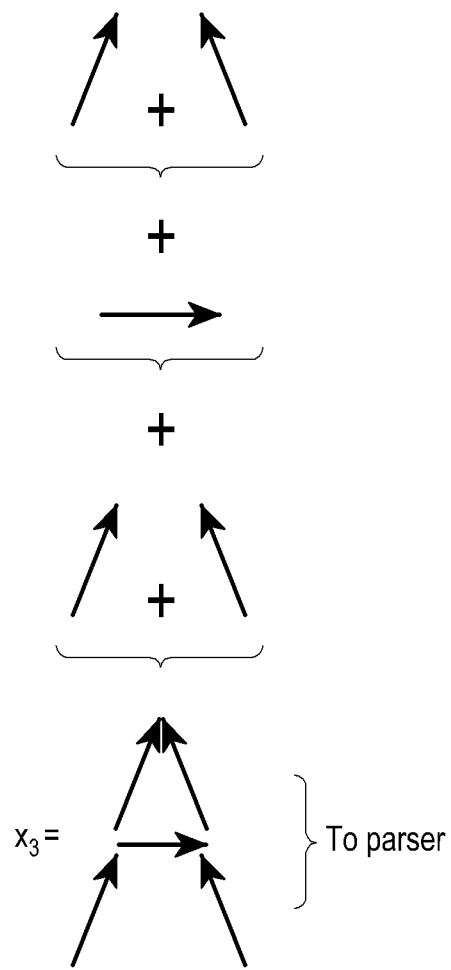

According to an embodiment of the present disclosure, among various pattern recognition methods, one of a higher recognition rate may be adopted. The pattern recognition methods may include template matching, a statistical approach, a neural network approach, and a structural approach. A template matching scheme is described with reference to FIG. 3A. A template (e.g., a standardized frame) for a comparative pattern is prepared. A pattern to be recognized is subjected to a normalization process to fit the pattern into template requirements. The pattern may be recognized using the degrees of similarity such as a correlation or distance. It may be essential in this method to prepare a standardized template that describes the category where various types of data belong. Template matching is relatively simple and enables quick processing. However, this pattern recognition scheme may be sensitive to variations in the features of a target pattern to be processed. The statistical approach determines a class where an unknown pattern is to be included based on a determination boundary generated in the statistical distribution of pattern sets belonging to each class, as shown in FIG. 3B. A statistical model of patterns is a probability density function in the class. The process of generating a probability density function for each class consisting of statistical models is denoted "studying." A pattern may be recognized by conducting classification based on Bayesian estimation. The neural network approach classifies patterns in the process where a network constituted of processing units (neurons) responds to input stimuli (patterns), as shown in FIG. 3C. In this case, the information (knowledge) on each pattern is stored as a weight factor of synapse. The neural network approach enables studying, learning, or training, and this scheme may treat a well-trained neural network as a black box. Further, this method may minimize prior knowledge and theoretically create any complicated determination region as long as there are sufficient layers of neurons. The structural approach obtains structural similarity between patterns and conducts classification based on the obtained structural similarity, as shown in FIG. 3D. The information (knowledge) on the pattern is represented in a formal grammar or graph-like correlation description. The structural approach is used to describe objects as well as to classify the objects. This structural approach formulates the hierarchical descriptions of complicated patterns built up from similar partial patterns.

According to an embodiment of the present disclosure, pattern recognition may be conducted per syllable, word, or sentence, using one of various afore-described pattern recognition algorithms. The unit of pattern recognition may be determined by the developer's design or the performance of processor.

According to an embodiment of the present disclosure, the memory of the electronic device may include a training database (DB). The training DB may be used for a pattern recognition algorithm (e.g., the neural network approach) to recognize patterns. The training DB may include information learned to increase the pattern recognition rate of the pattern recognition algorithm. Text data corresponding to each pattern may be retained in the training DB. The training DB may store learned information obtained by sufficiently training the pattern recognition algorithm (e.g., the neural network approach) in samples previously collected by the manufacturer, such as regarding the ethnicity, age and gender of users, and the shape of each user's mouth or a portion around the mouth, the shape of the user's eye, the user's look or a change in position of the user's eyebrow depending on the language the user speaks in order to reach a target recognition rate of, for example, the neural network approach. The training DB may store learned information obtained by sufficiently training the pattern recognition algorithm (e.g., the neural network approach) by the user of the electronic device in order to reach a target recognition rate of, for example, the neural network approach.

The neural network approach shows a relatively higher recognition rate as compared with the other pattern recognition algorithms. According to an embodiment of the present disclosure, the neural network approach may be adopted.

Figure 4B:
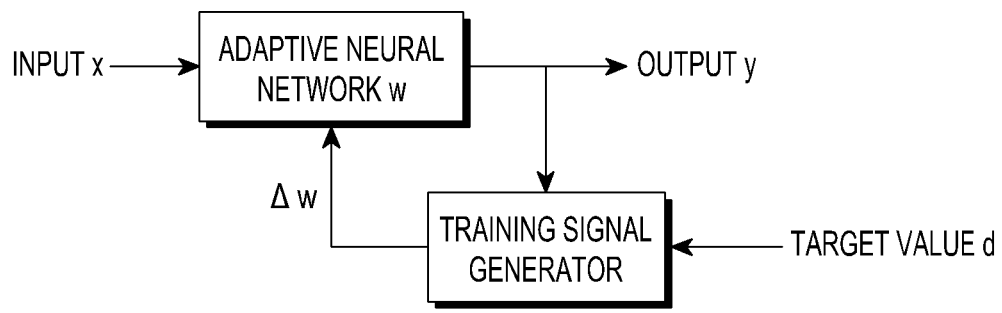

The neural network approach includes hidden layers including input nodes and middle nodes and output nodes. The recognition rate may be increased by training the pattern recognition algorithm in various shapes of mouths, portions around each mouth, and eyes and various positions of eye brows, and various movements of facial muscles, as input data, while experimentally adjusting the number of middle nodes and the hidden layers. The neural network approach allows for a high level of recognition rate alongside the optimal training time. There are various types of neural network algorithms as shown in FIG. 4A. Among others, Multilayer perception or Winner-Take-All Net may provide relatively better results in light of recognition rate and training time. A diversity of choices may be possible depending on the features of input patterns and the target recognition rates.

A training method based on the neural network approach is now described. The neural network approach has vectorial inputs and outputs or matrical weight factors. Accordingly, the neural network approach requires matrical computation. Thus, as the processor has a higher performance, the training time may be reduced. The neural network approach-based training method includes guided training, self-training, and competitive training. The guided training requires a pair of input x and target value d in training the neural network. The pair is called a training pattern pair. A general training procedure is as follows:

Step 1: design a neural network architecture suitable for application purpose

Step 2: initialize a weight factor

Step 3: input training pattern pair (x, d) to obtain output y of the neural network Step 4: compare output y and target value d to yield an error Step 5: input the error to a training signal generator to compute a variation $\Delta w$ in the weight factor Step 6: change the weight factor by $\Delta w$ Step 7: repeat steps 3 through 6 on the changed weight factor (W+$\Delta w$)

Step 8: terminate the procedure unless the weight factor is further changed

Figure 4C:
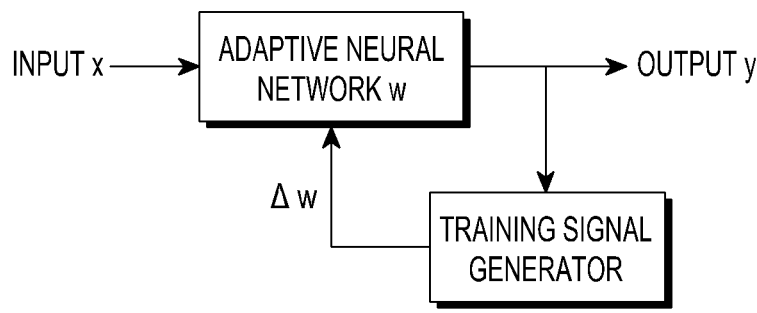

Self-training does not require a target value in training a neural network as shown in FIG. 4C. A general self-training procedure is as follows:

Step 1: design a neural network architecture suitable for application purpose

Step 2: initialize a weight factor

Step 3: input training pattern x to obtain output y of the neural network

Step 4: input output y to a training signal generator to compute a variation $\Delta w$ in the weight factor Step 5: change the weight factor by $\Delta w$ Step 6: repeat steps 3 through 5 on the changed weight factor (w+$\Delta w$)

Step 7: terminate the procedure unless the weight factor is further changed

Competitive training is the same as the guided training procedure except the weight factor of a specific portion only, rather than the overall weight factor, is changed at each step. In this sense, this process is eased, significantly reducing the time required to train the neural network.

According to an embodiment of the present disclosure, the manufacturer may include in the different device a recognition module having a neural network approach sufficiently trained in various patterns of the user for delivery of the user's intention so as to achieve a target recognition rate. Alternatively, whenever the user of the electronic device uses the electronic device, for example, each time a pattern for delivery of the user's intention is created, the neural network approach may be trained in the pattern, thus providing the user with a higher recognition rate. The training targets an increased recognition rate for the subsequent use. Accordingly, the electronic device may be trained in input patterns in real-time or intermittently depending on the number or length of input patterns or the processing capability of the processor in charge of the processing of the recognition module. Alternatively, non-realtime processing is possible which conducts training while the user's intention notification application is left activated but in idle mode or before the application is terminated or operated.

Figure 5A:
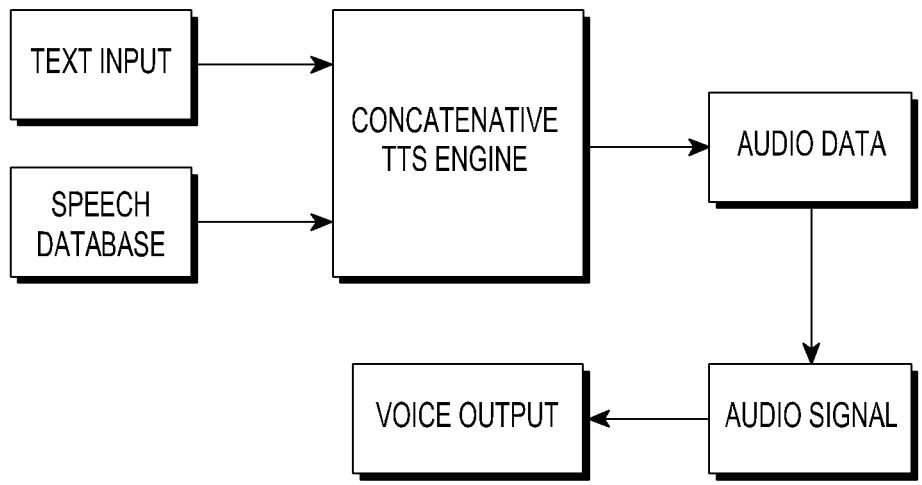
FIGS. 5A to 5B are views illustrating a TTS scheme according to an embodiment of the present disclosure.
Figure 5B:
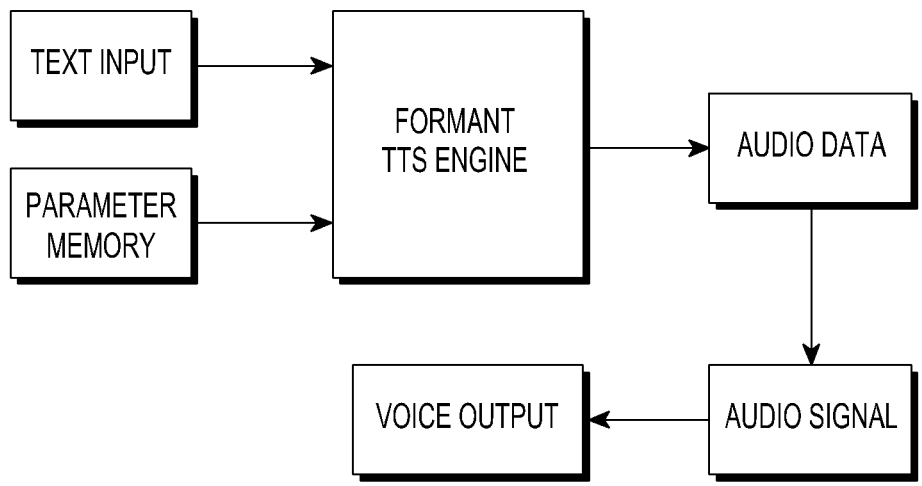

According to an embodiment of the present disclosure, the output control module 230 may convert the text data received from the recognition module 220 into voice data, and the output control module 230 may output the converted voice data as a result of the user's intention. The output control module 230 may perform the conversion using a TTS (Text-To-Speech) scheme. The TTS scheme may include a concatenative synthesis (CS) scheme and a formant synthesis (FS) scheme. The CS scheme provides a minimal database including recorded speech data or compressed speech data or a speech database including pre-recorded words and phrases as shown in FIG. 5A. The speech database contains data regarding speeches necessary for voice synthesis. In the CS scheme, when receiving text data from the recognition module 220 and speech data from the speech database, a concatenative TTS engine may generate an audio signal. The audio data is converted into an electrical audio signal to be output through the speaker of the electronic device 101 of FIG. 1, or through the speaker or earphone of the electronic device of the other party on the line of a call. The output control module 230 may contain a series of built-in dictionaries and pronounce rules required to output the text data as a voice. The FS scheme, unlike the CS scheme, provides an acoustic model instead of human speech samples or similar (compressed) speech data for voice synthesis as shown in FIG. 5B. In the FS scheme, when receiving text data from the recognition module 220 and a speech-related parameter from a parameter memory, a formant TTS engine may generate audio data. The audio data may be converted into an electrical audio signal that may be then output as a voice through the speaker of the electronic device or through the speaker or earphone of the electronic device of the other party on the line of a call. The CS scheme may provide an output result close to human voice, but this scheme requires a memory of a larger capacity to store speech data as compared with the FS scheme. The FS scheme is advantageous over the CS scheme in light of a low memory capacity. However, the output result is a little away from the human voice in comparison with the CS scheme. The FS would produce better quality of sound outputs close to human voice with progressing semiconductor design and processing technology. Ways to read and synthesize speech data into a voice output, as if the CS scheme does, would be preferable despite the fact that more data needs to be stored in the memory for a delicate voice output result. When a digital sound wave form of a voice signal is transmitted to an audio output end, the output control module 230 may transfer the user's intention received without voice, as voice data, to the other party's electronic device 104 through the speaker of the electronic device 101 or the speaker or earphone of the other party's electronic device 104. When the voice data is transferred to a transmitting end of the electronic device while the electronic device is on the line of a call, the output control module 230 may transmit the voice data to the speaker or earphone of the other party's electronic device 104 via a voice codec, an antenna of the transmitting end, and the base station and cellular network connected with the electronic device. The output control module 230 may perform filtering on the voice data with a filter, for example, a low-pass filter, high-pass filter, or band-pass filter, so that the voice data is closer to the human voice. For example, the filter parameters of the filter may be designed to produce various voice effects, such as making the user's voice sound funny like he inhaled helium or a diversity of voice tones, for example, a male voice tone or a high female voice tone.

An error may occur when determining the user's intention using template matching or a statistical, neural network, or structural approach. For example, in case an input departs from the user's input pattern as predicted, the neural network approach may produce a recognition result different from what is intended by the user. In such case, the recognition result should not be delivered to the other party without the user's confirmation. The output control module 230 may enable the voice data output as a result of the user's intention to be displayed as text data through the display 150 of the electronic device 101 or to be output through the speaker of the electronic device 101 or an earphone connected to the electronic device 101 so that the user may identify the result of the user's intention before the voice data is transmitted to the electronic device of the other party. When the text data is selected by the user while the text data is displayed on the display 150, the output control module 230 may convert the selected text data into voice data. The output control module 230, when the text data is modified while displayed on the display 150, may transfer the modified result to the recognition module 220 to update the training DB.

Figure 6:
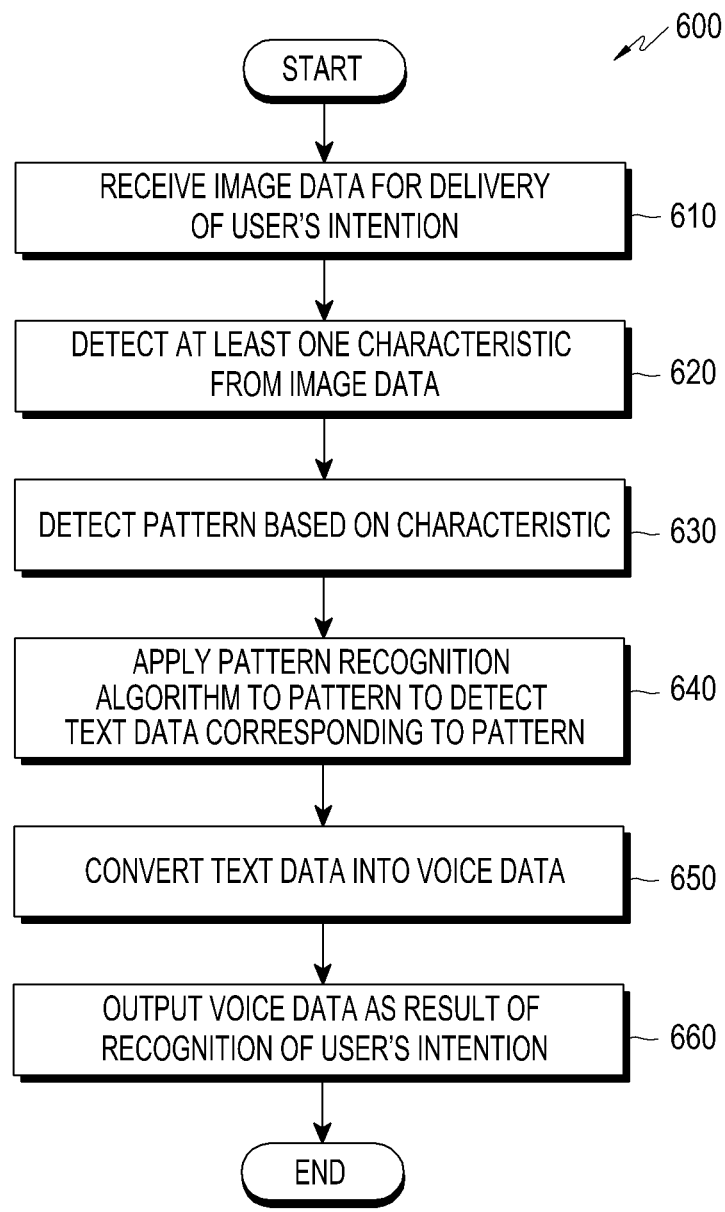
FIG. 6 is a flowchart illustrating an operation of outputting voice data from an electronic device according to an embodiment of the present disclosure.

FIG. 6 is a flowchart 600 illustrating an operation of outputting voice data from an electronic device according to an embodiment of the present disclosure. Referring to FIG. 6, the detection module 210 may receive image data for delivery of the user's intention in real-time or at each predetermined time (operation 610). The image data may be obtained by the camera module 180. The detection module 210 stores the image data in the memory 130 and may pre-process (e.g., noise removal, signal amplification, or gray level normalization) the image data using the image processing algorithm (operation 620). The detection module 210 may detect, from the pre-processed image data, at least one feature, for example, a mouth shape, around-mouth shape, a changing look (movement of a facial muscle), an eye shape, an eye blink, or a change in the position of an eye brow. The detection module 210 may transmit the at least one detected feature to the recognition module 220.

When receiving the feature, the recognition module 220 may combine the at least one feature into a pattern (operation 630).

The recognition module 220 may apply the obtained pattern to a pattern recognition algorithm, for example, the neural network approach, to determine text data (a phoneme, a syllable, a phrase, a clause, or a sentence) corresponding to the pattern (operation 640). The recognition module 220 may transmit the determined text data corresponding to the user's intention to the output control module 230.

The output control module 230, upon reception of the text data from the recognition module 220, may apply convert the text data into voice data using a TTS scheme (operation 650).

The output control module 230 may perform control to output the converted voice data through the speaker, earphone, or the other party's electronic device (operation 660). Optionally, at operation 660, the output control module 230 may perform control to transmit the voice data corresponding to the user's intention to the other party's electronic device so that the voice data may be output through the electronic device of the other party on the line of a call when receiving an output confirmation command from the user or without the user's confirmation depending on the settings made by the user. For example, when having an incoming call while the user is unavailable, the user may accept the call and talk with the other party at low voice before the camera module or may communicate with the other party without speaking out. The output control module 230 may deliver the user's intention to the other party facing the user by outputting the voice data through the speaker of the electronic device. For example, when the user is with speaking disability or is in the situation where he cannot speak, the electronic device may receive the user's mouth shape, around-mouth shape, eye shape, eye brow position, or look through the camera module and output voice data corresponding to the features including the received mouth shape or look, thus enabling communication with the other party.

At operation 660, the output control module 230 may perform control to display the text data corresponding to the voice data on the display 150. The user may identify whether the voice data, a result of the user's intention, is identical to what the user has originally intended from the text data displayed on the display 150. The output control module 230 may perform control to transmit the voice data to the other party's electronic device when receiving an output confirmation command from the user. The voice data may be output from the other party's electronic device on the line of a call. The output control module 230 may perform control to transmit the voice data to the other party's electronic device without the user's confirmation depending on the settings made by the user.

Figure 7:
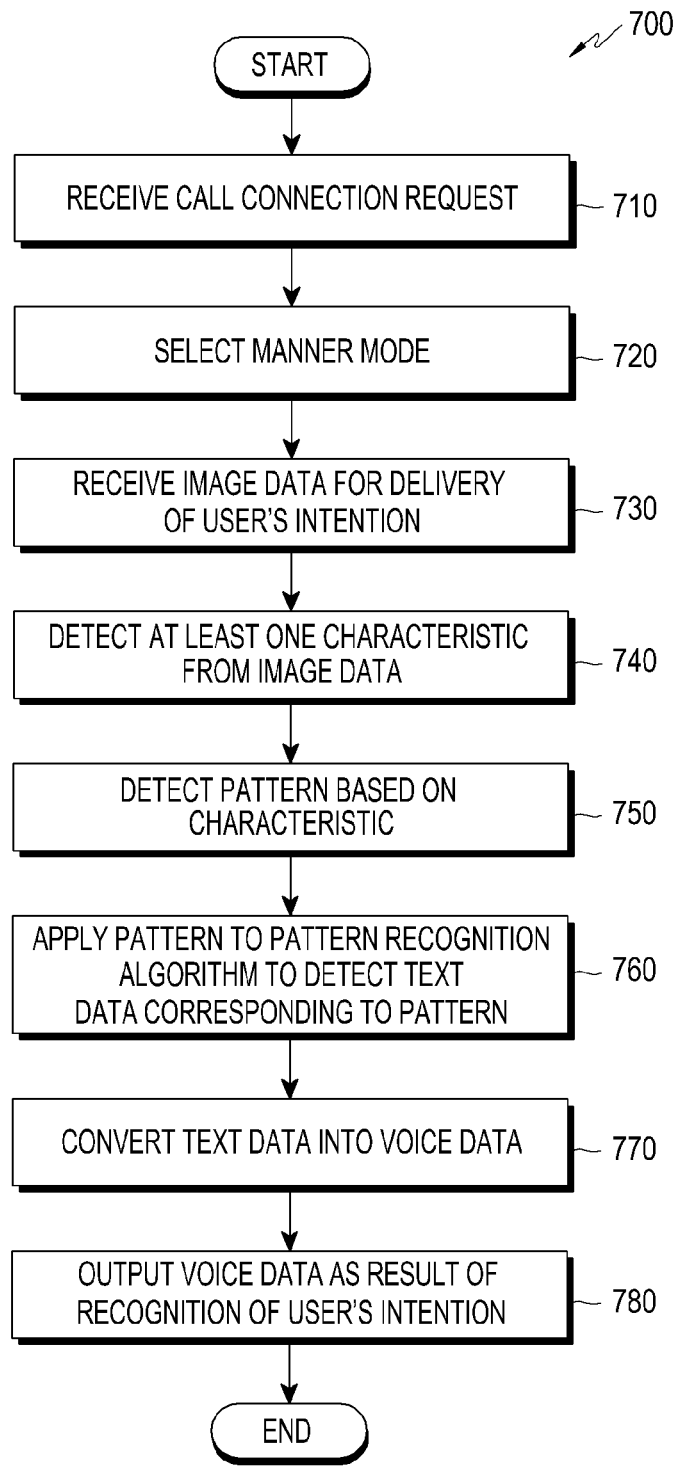
FIG. 7 is a flowchart illustrating an operation of outputting voice data from an electronic device according to an embodiment of the present disclosure.

FIG. 7 is a flowchart 700 illustrating an operation of outputting voice data from an electronic device according to an embodiment of the present disclosure. Particularly, FIG. 7 illustrates a voice data output operation performed by the electronic device 101 when the electronic device 101 is a mobile phone.

Figure 8A:
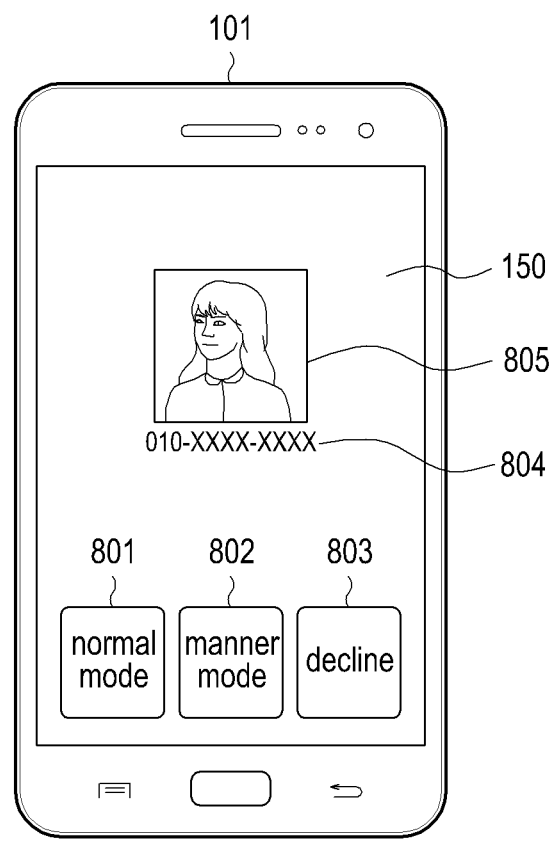
FIGS. 8A and 8B are views illustrating screen images of an electronic device according to embodiments of the present disclosure.

When the electronic device 101 receives a call connection request or call request, the processor 120 displays on the display 150 buttons 810, 802, and 803 respectively for selecting a normal mode, a manner mode, and a call refusal mode, as shown in FIG. 8A. In the normal mode, the user of the electronic device 101 may conduct a voice talk with the other party on the line of a call using the electronic device 101. In the manner mode, the user of the electronic device 101 may output voice data using image data obtained by the camera module, according to an embodiment of the present disclosure. The term "call refusal" as used herein may mean a command by which the user may decline the incoming call from the other party's electronic device. As shown in FIG. 8A, the electronic device 101, upon reception of the call connection request or call request, may display the other party's phone number, picture or image 805 on the display 150.

At operation 720, when the user selects the button 802, the processor 120 executes the manner mode to allow the user of the electronic device 101 to conduct a voice talk with the other party. In case the display 150 includes a touchscreen 201, the buttons 801, 802, and 803 may be selected by the user's touch. At operation 720, the user may select the button 810 to execute the normal mode. When the normal mode is in execution or when voice data received through the microphone of the electronic device 101 remains at a value not more than a reference value for a predetermined time, the electronic device 101 may automatically switch to manner mode. When the electronic device 101 switches to the manner mode, a visual indication 811, such as text or an icon indicating that the electronic device 101 is on the line of a call at the manner mode, may be displayed on the display 150 of the electronic device 101, or the electronic device 101 being on the line of a call at the manner mode may be informed in non-visual ways, for example, using a light ray, vibration, or smell. When the electronic device 101 switches to the manner mode, the camera module and the voice output module 170 may be activated.

At operation 730, the detection module 210 may receive image data for delivery of the user's intention in real-time or at each predetermined time. The detection module 210 may obtain the image data through the camera module.

At operation 740, the detection module 210 may store the image data in the memory 130 and may pre-process (e.g., noise removal, signal amplification, and gray level normalization) the image data using the image processing algorithm. The detection module 210 may detect, from the pre-processed image data, at least one feature, for example, the user's mouth shape, around-mouth shape, a change in the user's look (a movement of a facial muscle), the user's eye shape, eye blink or a change in the position of the user's eye brow. The detection module 210 may transmit the detected feature(s) to the recognition module 220.

At operation 750, the recognition module 220 may combine the received feature(s) into one pattern.

At operation 760, the recognition module 220 may determine text data (a phoneme, a syllable, a phrase, a clause, or a sentence) corresponding to the pattern by applying the pattern to a pattern recognition algorithm, for example, the neural network approach. The recognition module 220 may transmit the determined text corresponding to the user's intention to the output control module 230.

At operation 770, the output control module 230 may apply a TTS scheme to the received text data to convert the text data to voice data.

At operation 780, the output control module 230 may perform control to output the converted voice data through the speaker or earphone of the electronic device 101 or through the other party's electronic device.

Figure 8B:
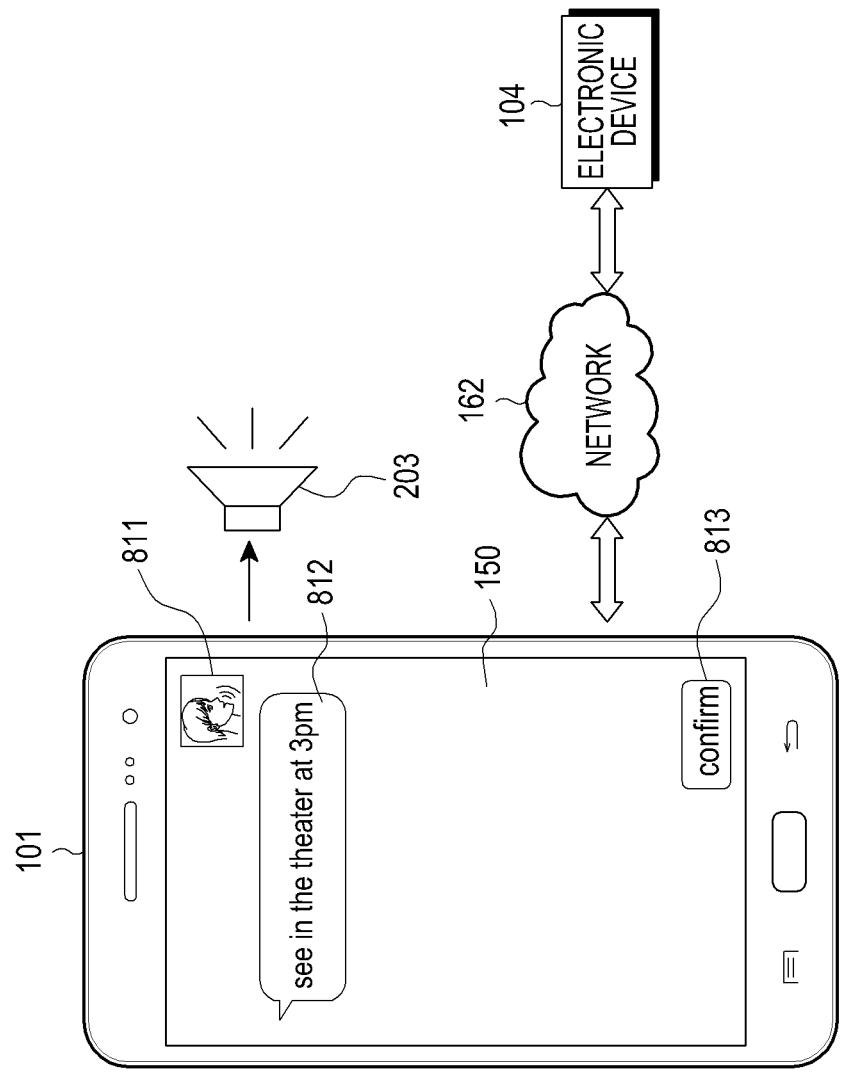

Additionally, at operation 780, the output control module 230 may perform control to display the text data corresponding to the voice data on the display 150 of the electronic device, as shown in FIG. 8B. The user may identify whether the voice data, a result of the recognition of the user's intention, is identical to what the user has originally intended by checking the text displayed on the display 150. The output control module 230 may perform control to transmit the voice data to the other party's electronic device when receiving an output confirmation command from the user. The output control module 230 may perform control to transmit the voice data to the other party's electronic device without the user's confirmation depending on the settings made by the user. FIG. 8B illustrates an example in which the text data that corresponds to the voice data, as obtained by the user and displayed on the display 150 is determined as the text saying "see in the theater at 3 PM." The determined text data is visually shown on the display 150 before converted into voice data. Accordingly, the user may identify from the text data displayed on the display 150 whether his intention is being displayed as voice data by the electronic device 101. Alternatively, the processor 120 may perform control to prevent the voice data from being output by the electronic device 101 before the user identifies from the text data displayed on the display 150 whether his intention is being output from the electronic device 101. In case the display 150 of the electronic device 101 has a touchscreen, 201 the processor 120 may perform control to generate a confirmation button 813 on the display 150 and to output the voice data when the confirmation button 813 is selected by the user's touch. The processor 120 may perform control to output the voice data or not, by recognizing, as a command, a predetermined gesture from the image data obtained by the camera module 180. Such gesture may include, but not is limited to, blinking (either or both of the user's eyes), a finger gesture, touching the screen, nodding, or head shaking.

Figure 9:
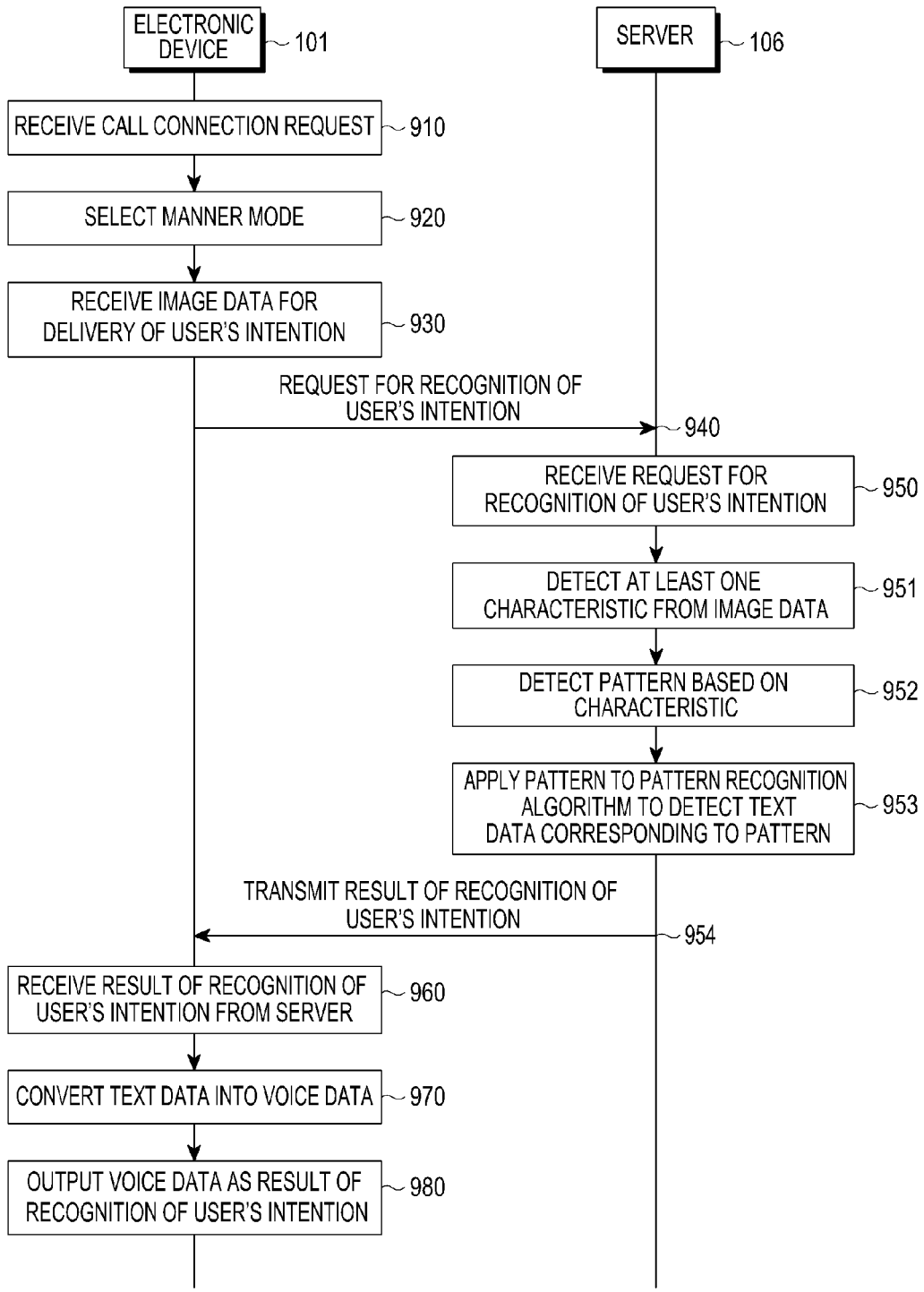
FIG. 9 is a flowchart illustrating an operation of outputting voice data from an electronic device according to an embodiment of the present disclosure.

FIG. 9 is a flowchart 900 illustrating an operation of outputting voice data from an electronic device according to an embodiment of the present disclosure. Particularly, FIG. 9 illustrates an exemplary operation of operating voice data from the electronic device 101 of FIG. 1, when the function corresponding to the voice output module 170 of the electronic device 101 is performed by a server 106 positioned remotely, according to an embodiment of the present disclosure.

At operation 910, when the electronic device 101 receives a call connection request from the other party's electronic device, the processor 120 displays buttons 801, 802, and 803 respectively for selecting the normal mode, manner mode, and call refusal mode on the display 150, as shown in FIG. 8A.

At operation 920, when the user selects the button 802, the processor 120 executes the manner mode and performs a voice call between the electronic device 101 and the other party's electronic device. In case the display 150 includes a touchscreen, the buttons 801, 802, and 803 may be selected by the user's touch on the screen. At operation 920, when the user selects the button 801 to execute the normal mode or when the voice data received through the microphone of the electronic device 101 remains at a value not more than a reference value for a predetermined time, the electronic device 101 may automatically switch to the manner mode. When the electronic device 101 switches to the manner mode, the camera module 180 and the voice output module 170 may enter activated mode.

At operation 930, the voice output module 170 may receive image data for delivery of the user's intention in real-time or at each predetermined time. The voice output module 170 may obtain the image data using the camera module 180.

At operation 940, the voice output module 170 transmits the image data to the remote server 106 to request the server 106 and to send a request for recognizing the user's intention.

At operation 950, the server 106 receives the request and the image data from the electronic device 101.

At operation 951, the server 106 may store the image data in the memory 130 and may pre-process (e.g., noise removal, signal amplification, or gray level normalization) the image data. The server 106 may detect, from the pre-processed image data, at least one feature, such as, for example, a mouth shape, an around-mouth shape, a look (movement of a facial muscle), an eye shape, an eye blink, or a change in position of an eye brow.

At operation 952, the server 106 may combine the at least one feature into a pattern.

At operation 953, the server 106 may apply the obtained pattern to a pattern recognition algorithm, for example, the neural network approach, to determine text data (a phoneme, a syllable, a phrase, a clause, or a sentence) corresponding to the pattern.

At operation 954, the server 106 transmits the determined text data to the electronic device 101.

At operation 960, the electronic device 101 receives the transmitted corresponding to a result of the recognition of the user's intention in response to the request for recognizing the user's intention.

At operation 970, the processor 120 of the electronic device 101 may convert the text data into voice data using a TTS scheme.

At operation 980, the processor 120 may perform control to output the converted voice data through the speaker or earphone of the electronic device or through the other party's electronic device that is on the line of a call with the electronic device. The processor 120 of the electronic device 101 may transmit to the other party's electronic device data obtained by voice-modulating the voice data. For example, the processor 120 of the electronic device 101 may make changes to the frequency or pitch of the user's voice into various different voice tones, for example, a low voice tone, a high voice tone, a female voice tone, an adult voice tone, or a child voice tone.

Additionally, at operation 980, the processor 120 may perform control to display the text data corresponding to the voice data on the display 150 of the electronic device as shown in FIG. 8B. The user may identify whether the voice data, a result of the recognition of the user's intention, is identical to what the user has originally intended by checking the text data 812 displayed on the display 150. The processor 120 may perform control to transmit the voice data to the other party's electronic device on the line of a call so that the voice data may be output through the other party's electronic device when an output confirmation command is input from the user. The processor 120 may perform control to transmit the voice data to the other party's electronic device without the user's confirmation depending on the settings made by the user. Alternatively, the processor 120 may perform control to prevent the voice data from being output by the electronic device 101 before the user identifies from the text data 812 displayed on the display 150 whether his intention is being output from the electronic device 101.

Additionally, at operation 930, the electronic device 101 may transmit a compressed form of the voice data to the server 106, and at operation 950, the server 106 may receive and decompress the compressed voice data. Additionally, at operation 953, the server 106 may transmit a compressed form of text data corresponding to a result of the recognition of the user's intention to the electronic device 101, and at operation 960, the electronic device 101 may decompress the compressed text data.

The processor 120 of the electronic device 101 may pre-process (e.g., noise removal, filtering, or compression) the image data obtained from the camera module 180, and the processor 120 may selectively store the pre-processed image data in the memory 130 in the form of raw data or compressed image data. The pre-processing may be conducted by a working memory (e.g., a random access memory (RAM) or buffer memory). The image data stored in the form of compressed data may be delivered to a predetermined or randomly assigned server 106 through the communication interface 160. The processor 120 may perform control to transmit the image data to the server 106 via the communication interface 160 of the electronic device without the pre-processing.

Figure 10:
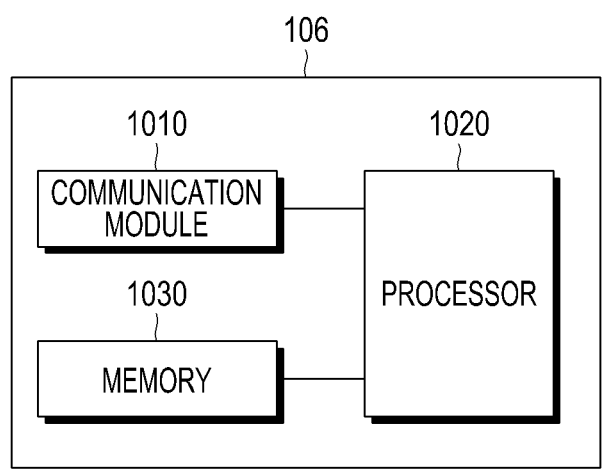
FIG. 10 is a block diagram illustrating a configuration of a server according to an embodiment of the present disclosure.

FIG. 10 is a block diagram illustrating a configuration of a server 106 according to an embodiment of the present disclosure.

Referring to FIG. 10, the server 106 may include a communication module 1010, a processor 1020, and a memory 1030. The processor 1020 may also be referred to as a controller.

The communication module 1010 communicates with the electronic device 101. The communication module 1010 receives from the electronic device 101 a request for recognizing the user's intention and voice data responding to the recognition request. The voice data may be compressed or pre-processed, and the compressed or pre-processed voice data may be received. The communication module 1010 transmits to the electronic device 101 a result of the recognition of the user's intention and text data or voice data responding to the recognition result. The text data or the voice data may be compressed before transmitted.

The processor 1020 may have a function similar to a function of the voice output module 170 of the electronic device 101. Accordingly, when receiving image data that has not undergone pre-processing, the processor 1020 may pre-process the image data. Alternatively, the processor 1020, upon reception of pre-processed image data from the electronic device 101, may detect at least one feature from the image data without pre-processing the image data. The processor 1020 may combine the detected at least one feature into a pattern, may apply a pattern recognition algorithm to the obtained pattern to determine text data, and may transmit the determined text data to the electronic device 101. The processor 1020 may perform control to convert the determined text data into voice data by a TTS scheme and to transmit the converted voice data to the electronic device 101. The processor 1020 may voice-modulate the voice data and transmit the voice-modulated voice data to the electronic device 101. For example, the processor 1020 may make changes to the frequency or pitch of the user's voice into various different voice tones, for example, a low voice tone, a high voice tone, a female voice tone, an adult voice tone, or a child voice tone.

The memory 1030 stores the voice data received from the electronic device 101. The memory 1030 may further store predetermined pattern information for voice recognition and pattern information additionally learned by the user of the electronic device 101.

The electronic device 101 may generate voice data by voice synthesis using a TTS converting unit, and as necessary, the electronic device 101 may selectively conduct a voice modulating process. According to an embodiment of the present disclosure, when the user cannot deliver his intention to the other party by speaking, the user may exactly do so in the manner mode as he can in the normal mode. The additional signal processing required for the manner mode over the normal mode might cause a processing delay over the normal mode. The processing delay may be addressed by an increased processing or communication performance of the electronic device 101 or by backup of the server with, for example, distributed signal processing.

The server 106 may determine text data corresponding to the user intention through a sufficiently trained pattern recognition process in the manner mode. The server 106 may additionally train the pattern recognition process in the image data received from the electronic device 101 to reflect the unique features of each user to the pattern recognition process, thus increasing the pattern recognition rate. For additional pattern learning, when the electronic device 101 is in the manner mode, the server 106 may internally perform an additional neural network approach process using the image data received from the electronic device 101. The electronic device 101 may perform an additional pattern learning process, and the electronic device 101 may deliver parameters of the learned patterns (e.g., weight matrix values learned by the neural network approach) to the server 106 so that the learned patterns may be used in subsequent pattern recognition. There may be various types of pattern learning that may vary depending on computing capabilities of the electronic device 101 and network conditions. For example, some of pre-processing steps may be conducted by the electronic device 101 if the computing capability of the electronic device 101 permits, while other steps (e.g., requiring more computing capability) may be performed by the server 106. When the left battery time of the electronic device 101 is insufficient, the server 106 connected with the communication network may carry out more processing steps. When the electronic device 101 and the server 106 are connected with a paid communication network, the electronic device 101 may transmit a minimum amount of compressed image information to the server 106, so that the server 106 handles most of necessary processing steps and transfers the processed result to the electronic device 101 via the network in the form of compressed voice data or text data. When the electronic device 101 is connected with a free-of-charge communication network, such as a free Wi-Fi network or Bluetooth network, the electronic device 101 may have various options for signal processing. It should be appreciated by one of ordinary skill in the art to which the present disclosure pertains that various changes may be made to the above-exemplified techniques under various conditions and that there may be various applications for providing call services in the manner mode.

Some candidates of the text data 812 corresponding to the user's intention, which has been detected from the image data in the manner mode of the electronic device 101 may be displayed on the display 150, and text data 812 to be converted into voice data may be selected from the candidates by the user. For example, when the user speaks another language other than the user's, the lip shape, movement of a muscle around the mouth, position of an eye brow, movement of a facial muscle other than the around-mouth muscles, the overall look, or as necessary, a finger or hand gesture may be additionally detected for each syllable, and at least one text data candidates corresponding to the user's intention may be displayed on the display 150. Of the at least one text data candidate, one selected by the user may be converted into voice data. The selection may be performed in various ways, such as, for example, by blinking either or both of the eyes, winking, making a predetermined gesture with a finger, touching the screen, nodding, or shaking head. The text data 812 corresponding to the user's intention may be repetitively displayed and selected per syllable, word, phrase, clause, or paragraph.

Figure 11:
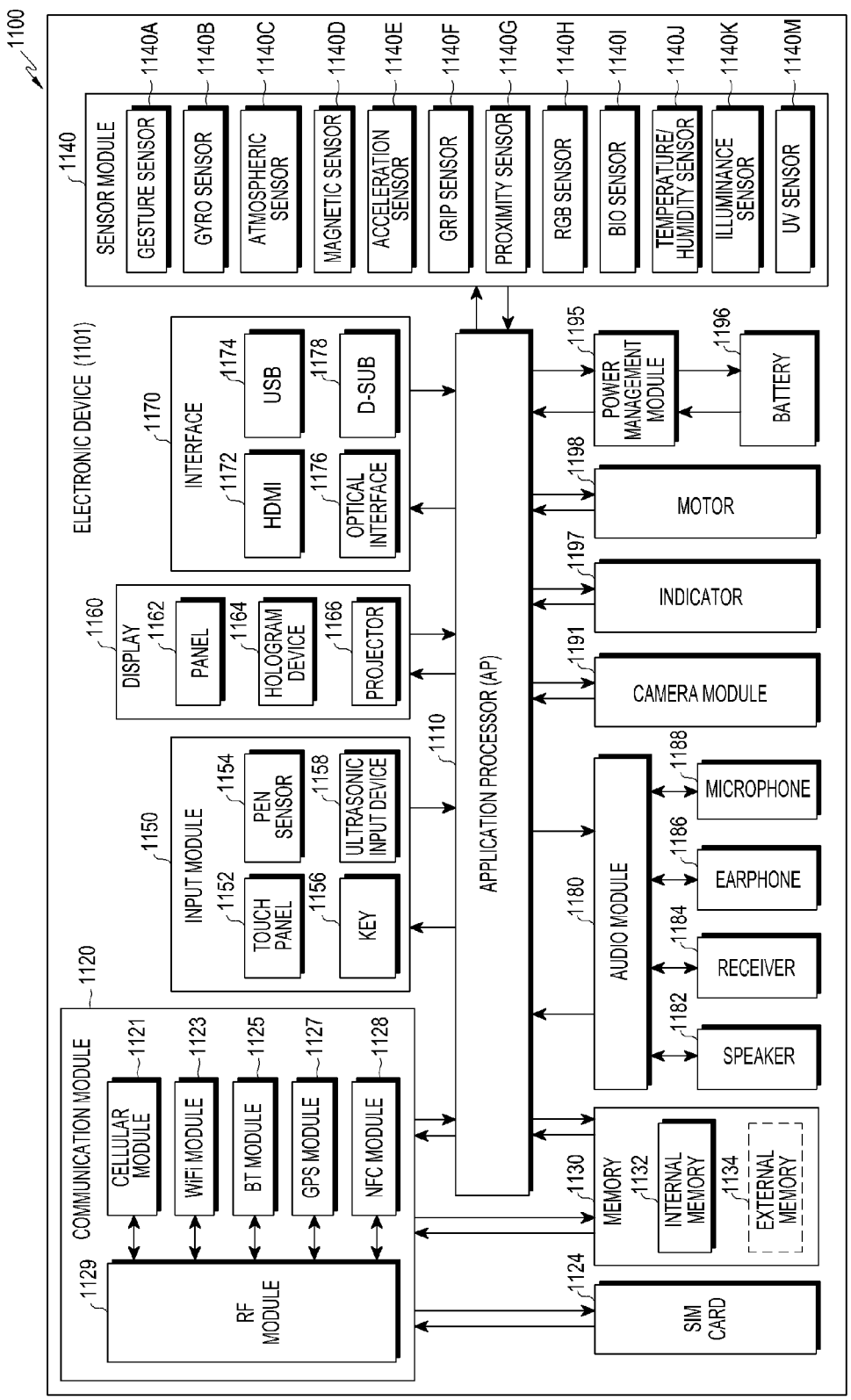
FIG. 11 is a block diagram illustrating a configuration of an electronic device according to an embodiment of the present disclosure.

FIG. 11 is a block diagram 1100 illustrating a configuration of an electronic device 1101 according to an embodiment of the present disclosure. The electronic device 1101 may include the whole or part of the configuration of, for example, the electronic device 101 shown in FIG. 1. Referring to FIG. 11, the electronic device 1101 may include one or more application processors (APs) 1110, a communication module 1120, an subscriber identification module (SIM) card 1124, a memory 1130, a sensor module 1140, an input device 1150, a display 1160, an interface 1170, an audio module 1180, a camera module 1191, a power management module 1195, a battery 1196, an indicator 1197, or a motor 1198.

The AP 1110 may control multiple hardware and software components connected to the AP 1110 by running an operating system or application programs, and the AP 1110 may process or compute various data including multimedia data. The AP 1110 may be implemented in, for example, a System on Chip (SoC). According to an embodiment of the present disclosure, the AP 1110 may further include a graphic processing unit (GPU) (not shown).

The communication module 1120 (e.g., the communication interface 160 of FIG. 1) may perform data communication with other electronic devices (e.g., the electronic device 104 or the server 106 of FIG. 1) connected with the electronic device 1101 (e.g., the electronic device 101 of FIG. 1) via a network. According to an embodiment of the present disclosure, the communication module 1120 may include a cellular module 1121, a WiFi module 1123, a BT module 1125, a GPS module 1127, an NFC module 1128, and a radio frequency (RF) module 1129.

The cellular module 1121 may provide voice call, video call, text, or Internet services through a communication network (e.g., an LTE, LTE-A, CDMA, WCDMA, UMTS, WiBro, or GSM network). The cellular module 1121 may perform identification or authentication on the electronic device in the communication network using, for example, a subscriber identification module (e.g., the SIM card 1124). According to an embodiment of the present disclosure, the cellular module 1121 may perform at least some of the functions providable by the AP 1110. For example, the cellular module 1121 may perform at least some of the multimedia control functions.

According to an embodiment of the present disclosure, the cellular module 1121 may include a communication processor (CP). The cellular module 1121 may be implemented in, for example, a SoC. Although in FIG. 11 the cellular module 1121 (e.g., a communication processor), the memory 1130, or the power management module 1195 are provided separately from the AP 1110, the AP 1110 may be configured to include at least some (e.g., the cellular module 1121) of the above-listed components, according to an embodiment of the present disclosure.

According to an embodiment of the present disclosure, the AP 510 or the cellular module 1121 (e.g., a communication processor) may load commands or data received from a non-volatile memory or other component connected thereto and process the loaded commands or data. The AP 1110 or the cellular module 1121 may store, in the non-volatile memory, data received from other component(s) or data generated by the other component(s).

The WiFi module 1123, the BT module 1125, the GPS module 1127, or the NFC module 1128 may include a process for, for example, processing data communicated through the module. Although in FIG. 11 the cellular module 1121, the WiFi module 1123, the BT module 1125, the GPS module 1127, and the NFC module 1128 are shown in their respective separate blocks, at least some (e.g., two or more) of the cellular module 1121, the WiFi module 1123, the BT module 1125, the GPS module 1127, and the NFC module 1128 may be included in a single integrated circuit (IC) or an IC package. For example, at least some of the processors respectively corresponding to the cellular module 1121, the WiFi module 1123, the BT module 1125, the GPS module 1127, and the NFC module 1128 (e.g., the communication processor corresponding to the cellular module 1121 and the WiFi processor corresponding to the WiFi module 1123) may be implemented in a single SoC.

An RF module 1129 may communicate data, for example, radio frequency (RF) signals. The RF module 1129 may include, for example, a transceiver, a power amp module (PAM), a frequency filter, or a low noise amplifier (LNA) (not shown). The RF module 1129 may further include parts (e.g., antennas, conductors or wires) for communicating radio waves in a free space upon performing wireless communication. Although in FIG. 11 the cellular module 1121, the WiFi module 1123, the BT module 1125, the GPS module 1127, and the NFC module 1128 share a single RF module 1129, the cellular module 1121, the WiFi module 1123, the BT module 1125, the GPS module 1127, or the NFC module 1128 may communicate RF signals through a separate RF module(s).

The SIM card 1124 may include a subscriber identification module, and the SIM card 1124 may be inserted into a slot formed at a predetermined position of the electronic device. The SIM card 1124 may contain unique identification information (e.g., an integrated circuit card identifier (ICCID) or subscriber information (e.g., an international mobile subscriber identity (IMSI).

The memory 1130 (e.g., the memory 130 of FIG. 1) may include an internal memory 1132 and an external memory 1134. The internal memory 1132 may include, for example, a volatile memory (e.g., a dynamic RAM (DRAM), a static RAM (SRAM), a synchronous dynamic RAM (SDRAM), etc.) or a non-volatile memory (e.g., one time programmable ROM (OTPROM), a programmable ROM (PROM), an erasable and programmable ROM (EPROM), an electrically erasable and programmable ROM (EEPROM), a mask ROM, a flash ROM, a NOT AND (NAND) flash memory, or a NOT OR (NOR) flash memory).

According to an embodiment of the present disclosure, the internal memory 1132 may be a solid state drive (SSD). The external memory 1134 may include a flash drive, for example, a compact flash (CF) memory, a secure digital (SD) memory, a micro-SD memory, a min-SD memory, an extreme digital (xD) memory, or a Memory Stick™. The external memory 1134 may be functionally connected with the electronic device 1101 via various interfaces. According to an embodiment of the present disclosure, the electronic device 1101 may further include a storage device (or storage medium) such as a hard disk drive.

The sensor module 1140 may measure a physical quantity or detect an operational stage of the electronic device 1101, and the sensor module 1140 may convert the measured or detected information into an electrical signal. The sensor module 1140 may include, for example, a gesture sensor 1140A, a gyro sensor 1140B, an atmospheric pressure sensor 1140C, a magnetic sensor 1140D, an acceleration sensor 1140E, a grip sensor 1140F, a proximity sensor 1140G, a color sensor 1140H such as a Red, Green, Blue (RGB) sensor, a bio sensor 1140I, a temperature/humidity sensor 1140J, an illumination sensor 1140K, or an Ultra Violet (UV) sensor 1140M. Additionally or alternatively, the sensor module 1140 may include, for example, an E-nose sensor, an electromyography (EMG) sensor, an electroencephalogram (EEG) sensor, an electrocardiogram (ECG) sensor, an infrared (IR) sensor, an iris sensor, or a finger print sensor which is not shown in the drawings. The sensor module 1140 may further include a control circuit for controlling at least one or more of the sensors included in the sensor module 1140.

The input module 1150 may include a touch panel 1152, a (digital) pen sensor 1154, a key 1156, or an ultrasonic input device 1158. The touch panel 1152 may recognize touch inputs in at least one of capacitive, resistive, infrared, or ultrasonic methods. The touch panel 1152 may further include a control circuit. With the capacitive method, physical contact or proximity detection may be possible. The touch panel 1152 may further include a tactile layer. In this regard, the touch panel 1152 may provide the user with a tactile response.

The (digital) pen sensor 1154 may be implemented in a way identical or similar to for example, how a touch input of a user is received, or by using a separate sheet for recognition. The key 1156 may include for example, a physical button, optical key or key pad. The ultrasonic input device 1158 may use an input tool that generates an ultrasonic signal and enable the electronic device 1101 to determine data by sensing the ultrasonic signal to a microphone 1188, thereby enabling wireless recognition. According to an embodiment of the present disclosure, the electronic device 1101 may receive a user input from an external device, such as a computer or a server through the communication module 520.

The display 1160 (e.g., the display 150 of FIG. 1) may include a panel 1162, a hologram device 1164, or a projector 1166. The panel 1162 may be, for example, a Liquid Crystal Display (LCD), Active Matrix Organic Light Emitting Diodes (AMOLEDs), or the like. The panel 1162 may be implemented to be flexible, transparent, or wearable. The panel 1162 may also be incorporated with the touch panel 1152 in a unit. The hologram device 1164 may make three dimensional (3D) images (holograms) in the air by using light interference. The projector 1166 may display an image by projecting light onto a screen. The screen may be, for example, located inside or outside of the electronic device 1101. In accordance with an embodiment, the display 1160 may further include a control circuit to control the panel 1162, the hologram device 1164, or the projector 1166.

The interface 1170 may include for example, a High Definition Multimedia Interface (HDMI) 1172, a USB 1174, an optical interface 1176, or a D-subminiature (D-sub) 1178. The interface 1170 may be included in for example, the communication interface 160 shown in FIG. 1. Additionally or alternatively, the interface 1170 may include a Mobile High-definition Link (MHL) interface, a secure digital (SD) card/multimedia card (MMC) interface, or infrared data association (IrDA) standard interface.

The audio module 1180 may perform various processes (e.g., encoding or decoding) relating to converting a sound wave and audio signal to an electric signal or vice versa. At least a part of the audio module 1180 may be included in for example, the input/output interface 140 as shown in FIG. 1. The audio module 1180 may process sound information input or output through for example, a speaker 1182, a receiver 1184, an earphone 1186, or a microphone 1188.

The camera module 1191 may be a device for capturing still images and videos, and may include, according to an embodiment of the present disclosure, one or more image sensors (e.g., front and back sensors), a lens, an Image Signal Processor (ISP), or a flash such as a light-emitting diode (LED) or xenon lamp.

The power management module 1195 may manage power of the electronic device 1101. Although not shown, for example, a Power management Integrated Circuit (PMIC), a charger IC, or a battery or fuel gauge is included in the power management module 1195.

The PMIC may be mounted on, for example, an IC or an SOC. A charging method may be divided into wired and wireless charging methods. The charger IC may charge a battery and prevent overvoltage or overcurrent from being induced from a charger. According to an embodiment of the present disclosure, the charger IC may be used in at least one of a cable charging scheme and a wireless charging scheme. The wireless charging scheme may include, for example, a magnetic resonance scheme, a magnetic induction scheme, or an electromagnetic wave based scheme, and an additional circuit, such as a coil loop, a resonance circuit, a rectifier, or the like may be added for wireless charging.

The battery gauge may measure an amount of remaining power of the battery 1196, a voltage, a current, or a temperature while the battery 1196 is being charged. The battery 1196 may save or generate electricity, and supply power to the electronic device 1101 with the saved or generated electricity. The battery 1196 may include, for example, a rechargeable battery or a solar battery.

The indicator 1197 may indicate a particular state of the electronic device 1101 or a part of the electronic device (e.g., the AP 1110), the particular state including for example, a booting state, a message state, or charging state. The motor 1198 may convert electric signals to mechanical vibration. Although not shown, a processing unit for supporting mobile TV, such as a GPU may be included in the electronic device 1101. The processing unit for supporting mobile TV may process media data conforming to a standard for Digital Multimedia Broadcasting (DMB), Digital Video Broadcasting (DVB), or media flow.

Each of the aforementioned components of the electronic device may include one or more parts, and a name of the part may vary with a type of the electronic device. The electronic device in accordance with various embodiments of the present disclosure may include at least one of the aforementioned components, omit some of them, or include other additional component(s). Some of the components may be combined into an entity, but the entity may perform the same functions as the components may do.

The term 'module' may refer to a unit including one of hardware, software, and firmware, or a combination thereof. The term 'module' may be interchangeably used with a unit, logic, logical block, component, or circuit. The module may be a minimum unit or part of an integrated component. The module may be a minimum unit or part of performing one or more functions. The module may be implemented mechanically or electronically. For example, the module may include at least one of Application Specific Integrated Circuit (ASIC) chips, Field Programmable Gate Arrays (FPGAs), or Programmable Logic Arrays (PLAs) that perform some operations, which have already been known or will be developed in the future.

At least a part of the device (e.g., modules or their functions) or method (e.g., operations) may be implemented as instructions stored in a computer-readable storage medium, for example, in the form of a programming module. The instructions, when executed by one or more processor (e.g., the processor 120), may cause the processor to carry out a corresponding function. The computer-readable storage medium may be, for example, the memory 130. At least a part of the programming module may be implemented by, for example, the processor 120. At least a part of the programming module may include, for example, a module, program, routine, set of instructions, process, or the like for performing one or more functions.

The computer-readable storage medium may include a hardware device configured to store and perform program instructions (e.g., programming module), such as magnetic media such as hard discs, floppy discs, and magnetic tapes, optical media such as Compact Disc ROMs (CD-ROMs) and Digital Versatile Discs (DVDs), magneto-optical media such as floptical disks, ROMs, RAMs, Flash Memories, and/or the like. Examples of the program instructions may include not only machine language codes but also high-level language codes which are executable by various computing means using an interpreter. The aforementioned hardware devices may be configured to operate as one or more software modules to carry out exemplary embodiments of the present disclosure, and vice versa.

Modules or programming modules in accordance with various embodiments of the present disclosure may include at least one or more of the aforementioned components, omit some of them, or further include other additional components. Operations performed by modules, programming modules or other components in accordance with various embodiments of the present disclosure may be carried out sequentially, simultaneously, repeatedly, or heuristically. Furthermore, some of the operations may be performed in a different order, or omitted, or include other additional operation(s).

According to an embodiment of the present disclosure, the commands stored in a storage medium may be configured to allow at least one processor to execute at least one operation when executed by the at least one processor. The at least one operation may include an operation of receiving a bio signal (e.g., a pulse wave signal) of the user by an electronic device (e.g., the electronic device 101), an operation of identifying whether the electronic device is carried or not by the user based on at least the bio signal, an operation (e.g., turn on/off) of independently operating a plurality of input/output devices (e.g., a display, speaker, or microphone) functionally connected with the electronic device based on the information on whether the electronic device is carried or not by the user.

As is apparent from the foregoing description, according to various embodiments of the present disclosure, an electronic device, server, and method for outputting a voice enables a phone user's intention to be output as a voice in the situation where he cannot speak.

The embodiments herein are provided merely for better understanding of the present disclosure, and the present disclosure should not be limited thereto or thereby. It should be appreciated by one of ordinary skill in the art that various changes in form or detail may be made to the embodiments without departing from the scope of the present disclosure defined by the following claims.

The invention claimed is:

1. An electronic device, comprising:
a camera module configured to obtain image data of a user during receiving a call connection request;
a controller configured to;
detect at least one feature corresponding to an intention of the user from the image data obtained by the camera module during receiving the call connection request;
generate a combined feature from the detected at least one feature for identifying the intention of the users;
obtain a pattern based on a difference between the combined feature and a trained feature based on a pre-trained pattern;
determine text data corresponding to the obtained pattern; and
convert at least a portion of the text data into voice data; and an output module configured to output the voice data,
wherein the controller is further configured to display on a display the text data corresponding to the voice data to allow the user to identify the voice data to be output before the voice data is outputted;
wherein the controller is configured to pre-process the image data and to detect the at least one feature from the pre-processed image data, and wherein the at least one feature includes a shape of a mouth, and a shape of a portion around a mouth.

2. The electronic device of claim 1, wherein the controller is configured to pre-process the image data and to detect the at least one feature from the pre-processed image data, and wherein the at least one feature includes a shape of an eye, a position of an eyebrow, a changing look, or an eye blink.

3. The electronic device of claim 1, wherein the controller is configured to apply the obtained pattern to a pre-trained pattern recognition algorithm to determine the text data corresponding to the obtained pattern.

4. The electronic device of claim 1, wherein the electronic device further comprises an output module including a communication module transmitting the voice data to another electronic device performing the call connection with the electronic device.

5. A method for outputting voice data in an electronic device, the method comprising:
obtaining image data of a user during receiving a call connection request;
detecting at least one feature corresponding to an intention of the user from the image data obtained by a camera module during receiving the call connection request;
generating a combined feature from the detected at least one feature for identifying the intention of the user;
obtaining a pattern based on a difference between the combined feature and a trained feature based on a pre-trained pattern;
determining text data corresponding to the obtained pattern;
converting at least a portion of the text data into voice data; and
outputting the voice data,
wherein the method further comprises displaying on a display the text data corresponding to the voice data to allow the user to identify the voice data to be output before the voice data is outputted;
wherein the controller is configured to pre-process the image data and to detect the at least one feature from the pre-processed image data, and wherein the at least one feature includes a shape of a mouth, and a shape of a portion around a mouth.

6. The method of claim 5, wherein the method further comprises transmitting the voice data to another electronic device performing the call connection with the electronic device.

7. The method of claim 5, wherein the method further comprises receiving the call connection request from another electronic device, and executing the camera module when a manner mode is selected.

8. The method of claim 5, wherein the intention of the user is determined based on at least a portion of the image data.

9. The method of claim 5, wherein the intention of the user is determined based on at least one feature detected from the image data.

10. The method of claim 9, wherein the intention of the user is determined based on at least one pattern obtained from the at least one feature.

11. An electronic device, comprising:
a camera module configured to obtain image data of a user during receiving a call connection request;
a controller configured to;
transmit image data obtained by the camera module to a server;
receive, from the server, text data or voice data corresponding to the image data; and
control output of the voice data corresponding to the image data; and an output module configured to output the voice data, wherein:
the received text data is data in which at least one feature corresponding to an intention of the user is detected from the image data obtained by the camera module during receiving the call connection request,
the detected at least one feature for identifying the intention of the user is processed to a combined feature, and
a pattern is obtained based on a difference between the combined feature and a trained feature based on a pre-trained pattern, wherein:
the received text data is determined that corresponds to the obtained pattern, and
wherein at least a portion of the text data is converted into the voice data, and wherein the controller is further configured to display on a display the text data corresponding to the voice data to allow the user to identify the voice data to be output before the voice data is outputted;
wherein the controller is configured to pre-process the image data and to detect the at least one feature from the pre-processed image data, and wherein the at least one feature includes a shape of a mouth, and a shape of a portion around a mouth.

12. The electronic device of claim 11, wherein:
the output module includes a speaker configured to output the voice data, and
the output module includes a communication module configured to transmit the voice data to another electronic device performing the call connection with the electronic device.

* * * * *